No. 835,739. PATENTED NOV. 13, 1906.
P. T. SUNDBERG.
SPRING NECK BEARING.
APPLICATION FILED FEB. 27, 1906.
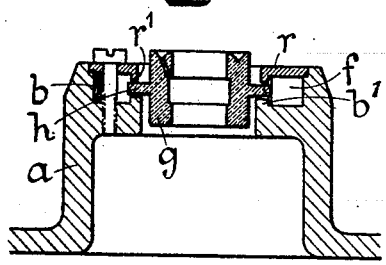
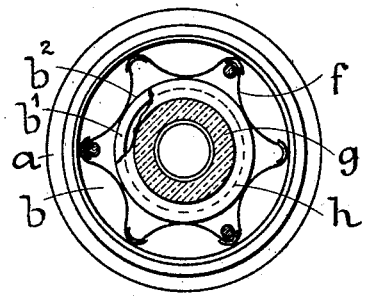

UNITED STATES PATENT OFFICE.

PER TEODOR SUNDBERG, OF STOCKHOLM, SWEDEN.

SPRING NECK-BEARING.

No. 835,739.　　　　Specification of Letters Patent.　　　　Patented Nov. 13, 1906.

Application filed February 27, 1906. Serial No. 303,309.

*To all whom it may concern:*

Be it known that I, PER TEODOR SUNDBERG, a subject of the King of Sweden, residing in Stockholm, Sweden, have invented certain new and useful Improvements in Spring Neck-Bearings, of which the following is a full, clear, and exact description.

The invention relates to spring neck-bearings for centrifugal machines and the like.

It is already known in neck-bearings for fast-running shafts or spindles to use a loose sleeve or bearing in which the spindle runs and a series of springs between that loose bearing and the fixed part of the bearing, so that the spindle and its loose bearing can adjust itself by sidewise movements relatively to the fixed part of the bearing. Hitherto, however, no fixed stops have been used for limiting the inward movement of said springs, or the stopping of that movement has been effected directly or indirectly by screws or similar means, which necessitate time-wasting adjustment for being brought into proper position and, besides, do not always remain in that position.

According to my invention the springs are so disposed that they rest inwardly upon a turned surface provided on the fixed part of the bearing, said turned surface being concentric with the axis of the bearing, so that the stopping of the inward movement of the springs is always effected properly and automatically without special adjustment.

In the accompanying drawings, which show a form of a bearing of the new type as an example, Figure 1 is a vertical section of the bearing, and Fig. 2 a plan view of the same after removal of the ring-like lid of the case or channel in which the springs are inclosed and with the sleeve or loose bearing shown in horizontal section just below said lid and with a part of the flange of said loose bearing broken away for showing the inner wall of said channel.

In the fixed part $a$ of the bearing a ring-like channel $b$ of suitably angular cross-section is turned concentric with the opening of the bearing. The springs $f$ of any suitable form are placed in the channel $b$, so as to press upon both side walls of said channel.

In the form shown in the drawings the inner side wall $b'$ of the channel $b$ is lower than the height (width) of the spring, so that the springs partly are exposed (uncovered) toward the opening of the bearing. This free part of the springs rests on the circumference of a ring-like flange $h$, provided on the outside of the loose sleeve or bearing $g$, the outer diameter of said flange being practically about the same as the diameter of the turned surface $b^2$, which limits the inward movement of the springs.

A ring $r$, which is detachably fixed to the fixed part $a$ of the bearing, serves as a lid for the channel or case $b$, so as to prevent the escape of the springs without hindering the free sidewise movement of the latter within said case or channel $b$.

The ring or lid $r$ may have a ring-like flange or shoulder $r'$ underneath at the inner edge, as shown, and the distance between the lower edge of said flange and the upper edge of the wall $b'$ should be so measured that the flange $h$ of the loose bearing $g$ has a free sidewise play. The outer diameter of flange $r'$ can suitably be equal to that of the ring-surface $b^2$. It is, however, not necessary to make the wall $b'$ low, as shown. It can have about the same height as the springs; but in such instance it must be provided with holes or notches, and the flange $h$ should have radial projections entering said holes or notches and adapted to play therein. The ring $r$ then may be quite flat—*i. e.*, the shoulder or flange $r'$ may be dispensed with.

The turned surface $b^2$ of the stopping-wall $b'$ and the corresponding turned surface of the flange or shoulder $r'$, which are shown cylindrical in the drawings, may also have another form—for instance, a conic one.

Having thus described my invention, what I claim is—

In spring neck-bearings for fast-running shafts or spindles, a number of flat springs supporting the center bearing with their backs, inclosed in a channel in the fixed part of the bearing, a fixed bearing having a channel for the springs formed by an outer wall in height a trifle more than the width of the springs, an inner wall $b'$ having a height of only a fraction of that of the outer wall, and an annular bottom, a plate $r$ forming the cover of said channel with a flange $r'$ in height equal to the wall $b'$, a center bearing with a flange $h$ radially projecting from it, and passing into and nearly filling the space between the wall $b'$ and the flange $r'$ substantially as described.

In testimony whereof I have hereunto set my hand in presence of two subscribing witnesses.

PER TEODOR SUNDBERG.

Witnesses:
HJALMAR ZETTERSTRÔM,
L. ROMELL.